United States Patent [19]

Funaki et al.

[11] Patent Number: 4,642,266
[45] Date of Patent: Feb. 10, 1987

[54] NON-FOGGING COATING COMPOSITION AND A SHAPED ARTICLE COATED THEREWITH

[75] Inventors: Masaaki Funaki, Toyonaka; Noboru Ohtani; Motoaki Yoshida, both of Nishinomiya; Akira Fujioka, Osaka; Kazuo Sakiyama, Ibaraki, all of Japan

[73] Assignees: Nippon Sheet Glass Co., Ltd.; Sumitomo Chemical Co., Limited, both of Osaka, Japan

[21] Appl. No.: 838,280

[22] Filed: Mar. 10, 1986

Related U.S. Application Data

[60] Division of Ser. No. 724,178, Apr. 17, 1985, Pat. No. 4,594,379, which is a continuation of Ser. No. 268,106, May 28, 1981, Pat. No. 4,522,966.

[30] Foreign Application Priority Data

May 29, 1980 [JP] Japan .................................. 55-71747
May 29, 1980 [JP] Japan .................................. 55-71748

[51] Int. Cl.$^4$ .............................................. B32B 27/36
[52] U.S. Cl. .................................................... 428/412
[58] Field of Search ....................................... 428/412

[56] References Cited

U.S. PATENT DOCUMENTS 3,843,390 10/1974 Hudson ............................... 428/412
3,928,708 12/1975 Fohlen ................................ 428/412
3,933,407 1/1976 Tu ....................................... 428/412
4,181,784 1/1980 Chattha et al. ..................... 525/161
4,181,785 1/1980 Chattha et al. ..................... 525/161
4,210,699 7/1980 Schroeter ............................ 428/412
4,396,678 8/1983 Olson .................................. 428/412

FOREIGN PATENT DOCUMENTS 1565671 4/1980 United Kingdom .
2036031A 6/1980 United Kingdom .

Primary Examiner—Paul R. Michl
Attorney, Agent, or Firm—Gordon W. Hueschen

[57] ABSTRACT

A non-fogging coating composition, which comprises (A) 0 to 50 parts by weight of epoxy group-containing organic silane compounds or partial hydrolyzates thereof, (B) 20 to 80 parts by weight of a polyhydric alcohol having an ethylene oxide chain, (C) 10 to 75 parts by weight of a polymer or copolymer having at least 20% by weight of repeating structural units having the general formula

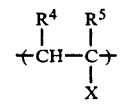

wherein, $R^4$ and $R^5$ independently stand for H or a lower alkyl group or carbonyl group and X stands for a side chain possessing an epoxy group, and (D) a catalytic amount of a curing catalyst. And a shaped article of polycarbonate type resin coated therewith.

23 Claims, No Drawings

NON-FOGGING COATING COMPOSITION AND A SHAPED ARTICLE COATED THEREWITH

This is a Division of copending application Ser. No. 724,178, filed Apr. 17, 1985, now U.S. Pat. No. 4,594,379, issued June 10, 1986, which in turn is a Continuation of application Ser. No. 268,106 filed May 28, 1981, now U.S. Pat. No. 4,522,966 issued June 11, 1985.

BACKGROUND OF THE INVENTION

1. Field of the Invention

This invention relates to a non-fogging coating composition for the formation of coating films excelling in non-fogging property or proofness against haze and resistance to scratch or to wear as well as weatherability and to shaped articles of polycarbonate type resins coated with the composition mentioned above. More particularly, this invention relates to a non-fogging coating composition excelling in non-fogging property, resistance to scratch and weatherability, and to coated shaped articles of polycarbonate type resins which are produced by forming substrates of polycarbonate type resins, coating the substrates with an undercoat of good adherency to the substrates, allowing the undercoat to set, then applying the non-fogging coating composition mentioned above as an overcoat to the set undercoat and allowing the overcoat to set and which, therefore, combines high resistance to scratch and good non-fogging property.

2. Description of the Prior Arts

The fault found with plastics, inorganic glasses, etc. which heretofore have been used as transparent materials is the fact that when their surface temperature falls below the dew point of the ambient air, their surfaces are fogged and consequently deprived of transparency even to an extent of causing a serious inconvenience. Various studies and experiments, therefore, have been made in search of a method capable of forming a non-fogging coat on the surface of such transparent materials.

It has been known to form such a coat by using a composition made preponderantly of a polymer of a hydroxyethyl methacrylate or polyvinyl alcohol, for example. This and all other non-fogging coating compositions heretofore put to trial are fairly satisfactory in terms of non-fogging property. Nevertheless, they are highly susceptible to injuries and destitute of scratch resistance and weatherability. The disadvantage has prevented them from being put to practical use.

Generally, polycarbonate type resins excel in impact resistance and transparency. They nevertheless have a disadvantage that they offer poor resistance to scratch and the action of solvents and readily sustain injuries on the surface and yield to organic solvents. Moreover, when the resin surface temperature falls below the dew point of the ambient air, the surface is fogged and deprived of transparency at times to an extent of causing no small inconvenience. To remedy the various disadvantages pointed out above, coating methods aimed at forming various coating films on their surface have been studied. None of them, however, have succeeded in providing a coating film which combines high resistance to scratch and non-fogging property and, at the same time, excels in adherency to substrates.

It is, therefore, an object of this invention to provide a coating composition which is capable of forming a coating film possessing non-fogging property and combining scratch resistance and weatherability.

Another object of this invention is to provide shaped articles of coated polycarbonate type resins excelling in resistance to scratch and non-fogging property as well as adherency of the coats to the substrates.

A further object of this invention is to provide a method for the manufacture of coated polycarbonate type resins which excel in resistance to scratch and non-fogging property as well as adherency of the coats to the substrates.

SUMMARY OF THE INVENTION

The objects described above are accomplished by the provision of a non-fogging coating composition, which comprises:

(A) 0 to 50 parts by weight (calculated as

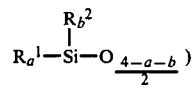

of at least one compound selected from the group consisting of epoxy group-containing organic silane compounds represented by the general formula (1):

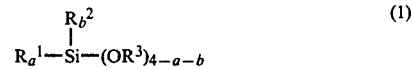

wherein, $R^1$ stands for an organic group having an epoxy group, $R^2$ for a hydrogen atom, a hydrocarbon group having 1 to 6 carbon atoms or a vinyl group, $R^3$ for a hydrocarbon group having 1 to 5 carbon atoms, an alkoxyalkyl group or an acyl group having 1 to 4 carbon atoms, a for an integer having the value of 1 to 3 and b for an integer having the value of 0 to 2, providing that $a+b \leq 3$ is satisfied, and partial hydrolyzates thereof, (B) 20 to 80 parts by weight of a polyhydric alcohol having an ethylene oxide chain, (C) 10 to 75 parts by weight of a polymer or copolymer containing at least 20% by weight of repeating structural units represented by the general formula (2):

wherein, $R^4$ and $R^5$ independently stand for a hydrogen atom, a lower alkyl group or a carboxyl group and X stands for a side chain possessing an epoxy group, and (D) a catalytic amount of a curing catalyst, providing that the total of the amounts of the aforementioned components (A), (B) and (C) is 100 parts by weight.

The coated shaped article of a polycarbonate type resin which combines resistance to scratch and non-fogging property comprises:

(I) a substrate of a polycarbonate type resin, (II) a layer of undercoat formed by applying to the surface of the substrate and allowing to cure thereon a composition containing a polymer selected from the group consisting of:

(i) a polymer possessing repeating structural units represented by the general formula (3):

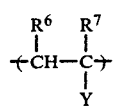

wherein, $R^6$ and $R^7$ independently stand for a hydrogen atom, an alkyl group having 1 to 5 carbon atoms or a carboxyl group and Y stands for a side chain containing a carboxyl group, an amino group or an epoxy group, and (ii) a polymer possessing repeating structural units represented by the formula (4):

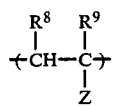

wherein, $R^8$ and $R^9$ independently stand for a hydrogen atom, a lower alkyl group or a carboxyl group and Z stands for a side chain containing a hydroxyl group, and repeating structural units represented by the formula (5):

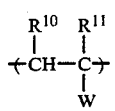

wherein, $R^{10}$ and $R^{11}$ independently stand for a hydrogen atom, a lower alkyl group or a carboxyl group and W stands for a side chain containing a carboxyl group, an alkoxycarbonyl group, an amino group, a substituted amino group, an epoxy group or a tetrahydrofuryl group, and (III) a layer of overcoat formed by applying to the surface of the undercoat and allowing to cure thereon a non-fogging coating composition, comprising:

(A) 0 to 50 parts by weight (calculated as

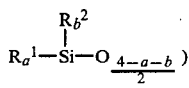

of at least one compound selected from the group consisting of epoxy group-containing organic silane compounds sented by the general formula (1):

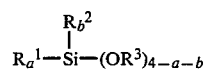

wherein, $R^1$ stands for an organic group having an epoxy group, $R^2$ for a hydrogen atom, a hydrocarbon group having 1 to 6 carbon atoms or a vinyl group, $R^3$ for a hydrocarbon group having 1 to 5 carbon atoms, an alkoxyalkyl group or an acyl group having 1 to 4 carbon atoms, a for an integer having the value of 1 to 3 and b for an integer having the value of 0 to 2, providing that $a+b \leq 3$ is satisfied, and partial hydrolyzates thereof, (B) 20 to 80 parts by weight of a polyhydric alcohol having an ethylene oxide chain, (C) 10 to 75 parts by weight of a polymer or copolymer containing at least 20% by weight of repeating structural units represented by the general formula (2):

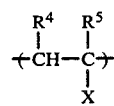

wherein, $R^4$ and $R^5$ independently stand for a hydrogen atom, a lower alkyl group or a carboxyl group and X stands for a side chain possessing an epoxy group, and (D) a catalytic amount of a curing catalyst,
providing that the total of the amounts of the aforementioned components (A), (B) and (C) is 100 parts by weight.

The coated shaped article of a polycarbonate type resin which combines resistance to scratch and non-fogging property is manufactured by:

(I) Preparing a substrate of a polycarbonate type resin,
(II) applying to the surface of the substrate as an undercoat a polymer selected from the group consisting of:
(i) a polymer possessing repeating structural units represented by the general formula (3) and
(ii) a polymer possessing repeating structural units represented by the general formula (4) and repeating structural units represented by the general formula (5), and
(III) applying to the surface of the undercoat as an overcoat a non-fogging-coating composition comprising:
(A) 0 to 50 parts by weight of at least one compound selected from the group consisting of epoxy group-containing organic silane compounds represented by the general formula (1) and partial hydrolyzates thereof,
(B) 20 to 80 parts by weight of a polyhydric alcohol possessing an ethylene oxide chain,
(C) 10 to 75 parts by weight of a polymer or copolymer containing at least 20% by weight of repeating structural units represented by the general formula (2), and
(D) a catalytic amount of a curing catalyst,
providing that the total of the amounts of the aforementioned components (A), (B) and (C) is 100 parts by weight.

PREFERRED EMBODIMENT OF THE INVENTION

Of the compounds which are usable as the component (A) in the present invention, the epoxy group-containing organic silane compounds represented by the general formula (1):

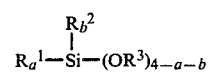

wherein, $R^1$ stands for an organic group having an epoxy group, $R^2$ for a hydrogen atom, a hydrocarbon group having 1 to 6 carbon atoms or a vinyl group, $R^3$ for a hydrocarbon group having 1 to 5 carbon atoms, an alkoxyalkyl group or an acyl group having 1 to 4 carbons, a for an integer having the value of 1 to 3 and b for an integer having the value of 0 to 2, providing that $a+b \leq 3$ is satisfied may be typified by the following concrete examples. Typical silane compounds containing one glycidoxy group are as follows:

Glycidoxymethyl trimethoxysilane
Glycidoxymethyl triethoxysilane
β-Glycidoxyethyl trimethoxysilane
β-Glycidoxyethyl triethoxysilane
γ-Glycidoxypropyl trimethoxysilane
γ-Glycidoxypropyl triethoxysilane
γ-Glycidoxypropyl tri(methoxyethoxy)silane
γ-Glycidoxypropyl triacetoxysilane
δ-Glycidoxybutyl trimethoxysilane
δ-Glycidoxybutyl triethoxysilane
Glycidoxymethyl dimethoxysilane
Glycidoxymethyl(methyl)dimethoxysilane
Glycidoxymethyl(ethyl)dimethoxysilane
Glycidoxymethyl(phenyl)dimethoxysilane
Glycidoxymethyl(vinyl)dimethoxysilane
Glycidoxymethyl(dimethyl)methoxysilane
β-Glycidoxyethyl(methyl)dimethoxysilane
β-Glycidoxyethyl(ethyl)dimethoxysilane
β-Glycidoxyethyl(dimethyl)methoxysilane
γ-Glycidoxypropyl(methyl)dimethoxysilane
γ-Glycidoxypropyl(ethyl)dimethoxysilane
γ-Glycidoxypropyl(dimethyl)methoxysilane
δ-Glycidoxybutyl(methyl)dimethoxysilane
δ-Glycidoxybutyl(ethyl)dimethoxysilane
δ-Glycidoxybutyl(dimethyl)methoxysilane Typical silane compounds containing two or three glycidoxy groups are as follows:

Bis-(glycidoxymethyl)dimethoxysilane
Bis-(glycidoxymethyl)diethoxysilane
Bis-(glycidoxyethyl)dimethoxysilane
Bis-(glycidoxyethyl)diethoxysilane
Bis-(glycidoxypropyl)dimethoxysilane
Bis-(glycidoxypropyl)diethoxysilane
Tris-(glycidoxymethyl)methoxysilane
Tris-(glycidoxymethyl)ethoxysilane
Tris-(glycidoxyethyl)methoxysilane
Tris-(glycidoxyethyl)ethoxysilane
Tris-(glycidoxypropyl)methoxysilane
Tris-(glycidoxypropyl)ethoxysilane Typical glycidyl group-containing silane compounds are as follows:

Glycidylmethyl trimethoxysilane
Glycidylmethyl triethoxysilane
β-Glycidylethyl trimethoxysilane
β-Glycidylethyl triethoxysilane
β-Glycidylpropyl trimethoxysilane
γ-Glycidylpropyl triethoxysilane
γ-Glycidylpropyl tri(methoxyethoxy)silane
γ-Glycidylpropyl triacetoxysilane Typical alicyclic epoxy group-containing silane compounds are as follows:

3,4-Epoxycyclohexylmethyl trimethoxysilane
3,4-Epoxycyclohexylmethyl triethoxysilane
3,4-Epoxycyclohexylethyl trimethoxysilane
3,4-Epoxycyclohexylpropyl trimethoxysilane
3,4-Epoxycyclohexylburyl trimethoxysilane The partial hydrolyzates of epoxy group-containing organic silane compounds to be used as the component (A) in the non-fogging coating composition of the present invention embrace those in which the alkoxy group, alkoxyalkoxy group or acyloxy group present in the organic silanes represented by the above mentioned general formula (1) containing at least one epoxy group is partially or wholly substituted by the hydroxyl group and those in which the hydroxyl groups involved in the substitution mentioned above have partially undergone natural mutual condensation. As is widely known, these hydrolyzates of epoxy group-containing silanes are obtained by hydrolyzing the corresponding epoxy group-containing organic silanes in a mixed solvent such as water with an alcohol in the presence of an acid.

The polyhydric alcohol possessing an ethylene oxide chain to be used as the component (B) in the present invention is a polyhydric alcohol which possesses at least one $-(CH_2CH_2O)-$ chain in the molecular unit thereof. When the polyhydric alcohol possessing the ethylene oxide chain has an excessively high molecular weight, the reactivity of the hydroxyl group is lowered to a point where the composition cures with difficulty and fails to acquire ample film-forming property. When it has an excessively low molecular weight, namely, when the content of the ethylene oxide chain is small, the composition fails to acquire a satisfactory non-fogging property. Consequently, the molecular weight of the polyhydric alcohol possessing the ethylene oxide chain is desired to fall in the range of from 100 to 3000, preferably from 200 to 2000.

Typical examples of the polyhydric alcohol possessing the ethylene oxide chain advantageously usable in this invention include diethylene glycol, triethylene glycol and other polyethylene glycols having molecular weights in the range of from 100 to 3000, preferably from 200 to 2000, diols of the general formula, $HOC_nH_{2n}OH$ (n=3–10) having 1 to 10, preferably 1 to 7, ethylene oxide chains attached to the opposite terminals thereof, polyhydric alcohols such as glycerol, trimethylol propane, diglycerol, pentaerythritol, adonitol, sorbitol and inositol which have an ethylene oxide chain attached to at least one hydroxyl group thereof, and various combinations thereof. Particularly, those polyhydric alcohols possessing an ethylene oxide chain represented by the following formula:

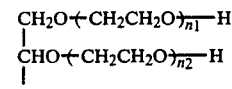

wherein, $n_1-n_m$ independently stand for integers of the values of 0 to 7, at least two of which symbols represent integers of the value of at least 1, and m stands for an integer of the value of 3 to 9, preferably those which have the values of 1 to 5 for the symbols $n_1-n_m$ in the aforementioned formula, are desirable examples.

The polymer (inclusive of oligomer) or copolymer (inclusive of cooligomer) possessing the repeating structural units represented by the general formula (2):

wherein, $R^4$ and $R^5$ independently stand for a hydrogen atom, a lower alkyl group or a carboxyl group and X stands for a side chain possessing an epoxy group which is used as the component (C) in the present invention is obtained by polymerizing or copolymerizing a vinyl monomer possessing at least one epoxy group in the molecular unit thereof as shown below. Specific examples of the vinyl monomer which possesses at least one epoxy group include glycidyl methacrylate and acrylate, β-glycidoxyethyl methacrylate and acrylate, allylglycidyl ether, 3,4-epoxybutyl methacrylate and acrylate and 4,5-epoxypentyl methacrylate and acrylate.

The component (C) need not be limited to the homopolymer or copolymer of a vinyl monomer possessing at least one epoxy group but may be a copolymer between a vinyl monomer possessing at least one epoxy group and other monomer copolymerizable therewith. As such other monomer, any of ordinary polymeric vinyl monomers such as, for example, esters of methacrylic acid and acrylic acid including methyl methacrylate and acrylate, ethyl methacrylate and acrylate, butyl methacrylate and acrylate, hydroxyethyl methacrylate and acrylate and diethylene glycol mono-methacrylate and acrylate; methacrylic acid and acrylic acid; styrene and vinyl acetate can be used. When the proportion of the repeating structural units of the aforementioned general formula contained in the component (C) is excessively small, the film formed of the composition is degraded in resistance to scratch. Consequently, the component (C) is desired to contain at least 20%, preferably 40%, by weight of the aforementioned repeating structural units.

As viewed from the standpoint of preparation, if the component (C) is to be obtained by polymerizing a vinyl monomer possessing an epoxy group all by itself, the monomer tends to undergo gelation due to its self-linkage. Thus, the component (C) is desired to be obtained by copolymerizing the vinyl monomer posessing the epoxy group with other monomer copolymerizable therewith.

In this invention, the aforementioned components (A), (B), and (C) are used in the respective proportions of 0 to 50 parts by weight, 20 to 80 parts by weight and 10 to 75 parts by weight (providing that the total thereof is 100 parts by weight). Preferably, they are respectively used in the proportions of 5 to 30 parts by weight, 30 to 50 parts by weight and 30 to 50 parts by weight. When the amount of the component (A) exceeds 50 parts by weight, the non-fogging property of the composition is notably degraded. When the component (A) is to be used in an amount falling within the range of from 5 to 15 parts by weight, either of the epoxy group-containing organic silane compound and the hydrolyzate thereof may be suitably used as the component (A). When the component (A) is to be used in an amount exceeding 15 parts by weight, however, it is desirable to use a partial hydrolyzate of an epoxy group-containing organic silane compound all by itself or a mixture of an epoxy group-containing organic silane compound with a partial hydrolyzate of an epoxy group-containing organic silane compound, particularly such a mixture having a hydrolyzate content of not less than 70% by weight, as the component (A). This is because when the epoxy group-containing organic silane compound in its unhydrolyzed form is present in a large amount in the composition, the composition is degraded in resistance to scratch as well as to hot water.

When the amount of the component (B) exceeds 80 parts by weight, the resistance to scratch is insufficient and the resistance to hot water is poor and, after prolonged use, the surface is deprived of its smoothness and the film rigidity is degraded. When it is less than 20 parts by weight, the non-fogging property is degraded. When the amount of the component (C) exceeds 75 parts by weight, the non-fogging property is degraded and, at the same time, the produced film possesses neither transparency nor surface smoothness. When it is less than 10 parts by weight, the film acquires poor resistance to hot water and low rigidity. When the content of the aforementioned repeating structural units in the polymer or copolymer which constitutes the component (C) falls within the range of from 20 to 40% by weight, the amount of the component (C) is desired to be not less than 30 parts by weight for the purpose of preventing otherwise possible loss of the film's resistance to scratch.

The curing catalyst to be used as the component (D) in the present invention must be capable of initiating a ring-opening polymerization. Examples of the curing catalyst advantageously usable herein include perchloric acid, hydrochloric acid, nitric acid, phosphoric acid, sulfuric acid, sulfonic acid, para-toluene sulfonic acid, boron trifluoride and complexes thereof with electron donors; Lewis acids such as $SnCl_4$, $ZnCl_2$, $FeCl_3$, $AlCl_3$, $SbCl_5$ and $TiCl_4$ and complexes thereof; metal salts of organic acids such as sodium acetate, zinc naphthenate, cobalt naphthenate, zinc octylate and tin octylate; metal salts of borofluoride such as zinc borofluoride and tin borofluoride; organic esters of boric acid such as ethyl borate and methyl borate; alkalis such as sodium hydroxide and potassium hydroxide; titanic esters such as tetrabutoxy titanate and tetraisopropoxy titanate; metal acetyl acetonates such as chromium acetyl acetonate, titanyl acetyl acetonate, aluminum acetyl acetonate, cobalt acetyl acetonate and nickel acetyl acetonate; amines such as n-butyl amine, di-n-butyl amine, tri-n-butyl amine, guanidine, biguanide and imidazole; and ammonium perchlorate. It is particularly desirable to use ammonium perchlorate, among other curing catalysts enumerated above. When ammonium perchlorate is used as the curing catalyst, the coating composition readied for application to the substrate enjoys a long pot life and the curing conditions such as the temperature and time of curing by baking are practical and the produced film excels in resistance to water and in adherency to the substrate. When the amount of the curing catalyst to be added is excessively small, the time required for the curing of the film becomes long. When it is excessively large, it impairs rather than improves the resistance to water and tends to impart a color to the produced film. Thus, the curing agent is desired to be added in an amount within the range of from 0.05 to 20 parts, preferably from 0.1 to 10 parts by weight, based on 100 parts by weight of the total of the components (A), (B) and (C).

For the purpose of this invention, it is not always necessary to incorporate in the composition a cross-linking agent besides the components (B) and (C) and the curing catalyst. When the composition contains the component (A) in an amount of less than 5 parts by weight, inclusion of a cross-linking agent is preferable. When the cross-linking agent happens to be of a type containing an epoxy group, it is capable of enabling the film produced by the coating composition to acquire improved resistance to wear. Examples of the cross-linking agent containing an epoxy group advantageously usable herein include polyphenols such as Bisphenol A, Bis-phenol F, resorcinol and novolak resin; polyglycidyl ethers obtained from epichlorohydrin and polyhydric alcohols such as ethylene glycol, polyethylene glycol, propylene glycol, polypropylene glycol, glycerin, diglycerol, neo-pentyl glycol, trimethylol propane, pentaerythritol and sorbitol; polyglycidyl esters obtained from epichlorohydrin with polybasic acids such as phthalic acid, hexahydrophthalic acid and dimer acid; polyglycidyl amines obtained from epichlorohydrin with amines such as aniline, toluidine, 4,4'-diaminodiphenyl methane and isocyanuric acid; and alicyclic epoxy resins such as cyclopendadine dioxide and cyclohexane oxide. These compounds can be used either independently or in various combinations of two or more members. The cross-linking agent, particularly the cross-linking agent of the type containing an epoxy group, is desired to be added in an amount falling within the range of from 3 to 80 parts, preferably from 5 to 60 parts, by weight based on 100 parts by weight of the total of the components (B) and (C).

The non-fogging coating composition formed of the three components (A), (B) and (C) plus the curing catalyst (D) can have its wetting property improved by additionally incorporating therein a surface active agent. The surface active agent need not be limited to any specific compound. Any of the surface active agents heretofore known to the art may be used effectively. It is nevertheless desirable to use a nonionic surface active agent of the polyoxyethylene type. Typical nonionic surface active agents are those of the polyoxyethylene alkyl ether type, $R-O-(CH_2CH_2O)_nH$, the polyoxyethylenes alkyl aryl ether type,

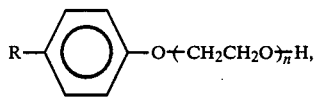

the polyoxyethylene alkyl amine type, $R-NH-CH_2CH_2O-_nH$ and

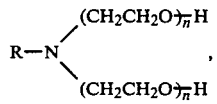

the polyoxyethylene alkyl amide type, $R-CONH-CH_2CH_2O-_nH$ and

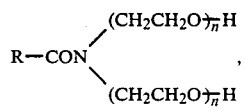

the polyethylene polyol ester type,

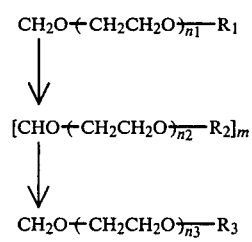

wherein, $n_1$ to $n_3$ independently stand for integers of the values of 1 to 7, $R_1$ to $R_3$ independently stand for a hydrogen atom or an acyl group having 6 to 16 carbon atoms, and m stands for an integer of the value of 1 to 9, and the polyoxyethylene sorbitan ester type

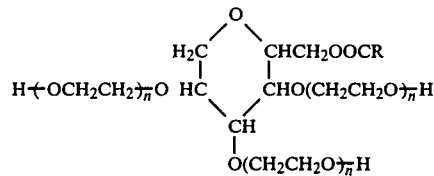

In preparation for actual use, the non-fogging coating composition of the present invention generally is diluted to a concentration suitable for surface application. Examples of the solvent which can be used for this dilution include alcohols, ketones, esters, ethers, cellosolves, halides, carboxylic acids and aromatic compounds. These solvents can be used either singly or in various combinations of two or more members. In the compounds enumerated above, it is particularly desirable to use, either independently or in varying combinations, lower alcohols (such as, for example, methanol, ethanol, propanol and butanol), cellosolves (such as, for example, methyl cellosolve), lower alkyl carboxylic acids (such as, for example, formic acid, acetic acid and propionic acid), aromatic compounds (such as, for example, toluene and xylene) and esters (such as, for example, ethyl acetate and butyl acetate). Optionally, the composition of this invention can further incorporate a flow control agent for the purpose of providing a smooth film. For this purpose, it suffices to add the flow control agent in a small amount, specifically, less than 5% by weight based on the solids content of the composition.

Coating of a given substrate with the composition of this invention is accomplished by applying the composition to the substrate by any of ordinary coating methods such as immersion method, spray method, roller coating method and, flow coating method and subsequently baking the coated substrate at a temperature not exceeding the deforming temperature of the substrate for a period of 15 minutes to five hours. Consequently, there is obtained a coating film which excels in non-fogging property, resistance to scratch, resistance to hot water, adherency to the substrate and weatherability.

Optionally, the non-fogging coating composition can readily be dyed after it has been applied to the substrate and cured by baking. The dyeing can be effected, as disclosed in Japanese Patent Application No. 35262/1979, by causing the substrate already coated with the non-fogging coating composition to be dyed with a vaporizable coloring agent in a gaseous phase. Otherwise, it can be accomplished, as disclosed in Japanese Patent Application No. 77525/1979, by bringing the substrate already coated with the non-fogging coating composition into contact with a dyeing solution containing a coloring agent, a surface active agent and optionally a solvent in amounts such that the amount of the surface active agent falls within the range of from 0 to 100% by weight based on the total amount of the surface active agent and the solvent.

The thickness of the coat formed by applying the non-fogging coating composition of this invention to the substrate and subsequently baking the applied layer of the composition is desired to fall within the range of from 1 to 40 microns, preferably 3 to 30 microns. When the thickness is less than 1 micron, the film is deficient in proofness against fogging and resistance to scratch. When it exceeds 40 microns, the film offers poor resistance to hot water and exhibits inferior adherency to the substrate.

The composition of this invention can be applied to substrates of plastics such as polycarbonate, polymethyl methacrylate, polystyrene, polyvinyl chloride, polyester and cellulose as well as to substrates of glass. Optionally, the substrate can be treated with a primer so that the produced coating film may acquire enhanced adherency to the substrate.

Examples of polycarbonate type resins usable in the present invention include polycarbonate of the kind disclosed in U.S. Pat. No. 3,305,520 and reported in Christopher and Fox: "Polycarbonates," pages 161–176 (1962) and diethylene glycol bis-allyl carbonate besides bis-phenol type polycarbonates such as 4,4'-isopropylidene diphenol carbonate. These polycarbonates are used in the form of shaped articles such as, for example, glasses lens, ski goggles, doors, automobile windows and partitions.

When the polycarbonate type resin shaped article is coated with the above-mentioned coating composition, it is preferable to coat (II) a polymer selected from the group consisting of (i) a polymer having a repeated structural unit represented by the general formula (3) (ii) a polymer having a repeated structural unit represented by the general formula (4) and a repeated structural unit represented by the general formula (5) as an under layer.

Now the undercoat layer to be interposed between the aforementioned overcoat layer and the shaped substrate of polycarbonate type resin for the purpose of enhancing the adhesiveness of the overcoat to the substrate will be described. The undercoat composition which is particularly suitable for use on the shaped substrate of polycarbonate type resin is a paint which is preponderantly formed of (i) a polymer having repeating structural units represented by the general formula (3):

wherein, $R^6$ and $R^7$ independently stand for a hydrogen atom or a lower alkyl group or carboxyl group and Y for a side chain containing a carboxyl group, amino group or epoxy group or (ii) a polymer having repeating structural units represented by the general formula (4):

wherein, $R^8$ and $R^9$ independently stand for a hydrogen atom or a lower alkyl group of 1 to 5 carbon atoms or carboxyl group and Z for a side chain containing a hydroxyl group and repeating structural units represented by the general formula (5):

wherein, $R^{10}$ and $R^{11}$ independently stand for a hydrogen atom or a lower alkyl group of 1 to 5 carbon atoms or carboxyl group and W for a side chain containing a carboxyl group, alkoxycarbonyl group, amino group, substituted amino group, epoxy group or tetrahydrofuryl group.

The aforementioned polymer (i) contains the repeating structural units represented by the general formula (3) in an amount of at least 5 mol%, preferably in an amount within the range of from 10 to 100 mol%. The polymer (ii) is desired to contain each of the repeating structural units of the general formulas (4) and (5) in an amount of at least 2.5 mol%, preferably in an amount within the range of from 5 to 90 mol%.

The polymer (i) of the aforementioned description can easily be prepared by using one member of the group of vinyl monomers enumerated below, either alone or in the form of a copolymer with some other monomer copolymerizable therewith. The vinyl monomers mentioned above are acrylic acid, methacrylic acid, crotonic acid, maleic acid, itaconic acid, aminomethyl(meth)acrylate, (meth)acrylamide, crotonamide and glycidyl (meth)acrylate. These vinyl monomers may be used either independently of one another or in the form of a mixture of two or more members, As other monomers which are copolymerizable with the vinyl monomers mentioned above and the vinyl monomers (iii) and (iv) to be described afterwards, there may be used any compounds satisfying the requirement that they should contain at least one ethylenically unsaturated bond within the molecular units. Examples of such compounds include olefins such as ethylene, diolefins such as butadiene, vinyl compounds such as vinyl chloride, vinylidene chloride and acrylonitrile, and esters of acrylic acid or methacrylic acid such as methyl(meth)acrylate. These monomers may be used either independently of one another or in the form of a mixture of two or more members. The polymer (i) may be used solely or in combination with one or more as undercoat.

The polymer (ii) of the aforementioned description can be prepared by copolymerizing the vinyl monomer (iii) and the vinyl monomer (iv) to be described afterwards, optionally in conjunction with some other monomer which is copolymerizable with the two vinyl monomers mentioned above. Examples of the vinyl monomer (iii) mentioned above include allyl alcohol; N-hydroxymethyl (meth)acrylamide, N-(2-hydroxyethyl) (meth)acrylamide, N,N-dihydroxymethyl (meth)acrylamide, N,N-di(2-hydroxyethyl) (meth)acrylamide; 2-hydroxyethyl (meth)acrylate, 1,4-butyleneglycol mono(meth)acrylate, glycerol mono(meth)acrylate, hydroxyallyl methacrylate, polyethylene glycol mono(meth)acrylate, polypropyleneglycol mono(meth)acrylate; hydroxymethyl aminomethyl (meth)acrylate, 2-hydroxyethyl aminomethyl (meth)acrylate, 2,-(2-hydroxyethylamino)ethyl (meth)acrylate, N,N-di(hydroxymethyl)aminomethyl (meth)acrylate and N,N-di(2-hydroxyethyl)aminomethyl (meth)acrylate. These vinyl monomers (iii) may be used either independently of one another or in the form of a mixture of two or more members.

Example of the vinyl monomer (iv) mentioned include acrylic acid, methacrylic acid, crotonic acid, vinyl-acetiac acid, maleic acid, itaconic acid; methyl(metho)acrylate, ethyl(meth)acrylate; (meth)acrylamide, crotonamide; N-methyl (meth)acrylamide, N-ethyl (meth)acrylamide, N-propyl (meth)acrylamide, N-butyl (meth)acrylamide, N-tert-butyl (meth)acrylamide, N,N-dimethyl (meth)acrylamide, N,N-diethyl (meth)acrylamide, N,N-dipropyl (meth)acrylamide, N,N-dibutyl (meth)acrylamide, N-butoxymethyl (meth)acrylamide, N-isobutoxymethyl (meth)acrylamide, 2-(N-methylamino)-ethyl (meth)acrylate, 2-(diethylamino)ethyl (meth)acrylate, 2-(n,N-dimethylamino)ethyl (meth)acrylate, 2-(N,N-diethylaminoethyl) (meth)acrylate, 2-(N,N-dibutylamino)ethyl (meth)acrylate, 3-(N,N-diethylamino)propyl (meth)acrylate, 2-(N,N-dibutylamino)propyl (meth)acrylate, 3-N,N-dibutylamino)propyl (meth)acrylate; (meth)acryl glycidyl ether, allyl glycidyl ether, glycidyl (meth)acrylate, glycidyl crotonate; and tetrahydrofurfuryl (meth)acrylate. These vinyl monomers (iv) may be used either independently of one another or in the form of a mixture of two or more members. The polymer (ii) may be used solely or in combination with one or more as undercoat.

Of these compositions, the one containing a polymer (ii) respectively having repeated structural units shown by the general formula (4) and (5) as a main component is especially preferable.

Of these vinyl monomers (iii) constituting the above-mentioned polymer (ii), the especially preferable ones are N-hydroxymethyl (meth)acrylamide, N-(2-hydroxyethyl) (meth)acrylamide, N,N-dihydroxymethyl (meh)acrylamide, N,N-di(2-hydroxyethyl) (meh)acrylamide, 2-hydroxyethyl (meth)acrylate, 2-hydroxypropyl (meth)acrylate, 1,4-butyleneglycol mono(meth)acrylate, polyethyleneglycol mono(meth)acrylate, polypropyleneglycol mono(meth)acrylate and the like. Further, of these vinyl monomers (iv), the esecially preferable ones are methyl (meth)acrylate, ethyl(meth)acrylate, 2-(N-methylamino)ethyl (meth)acrylate, 2-(ethylamino)ethyl (meth)acrylate, 2-(N,N-dimethylamino)ethyl (meth)acrylate, 2-(N,N-diethyl(amino)ethyl (meth)acrylate, 2-(N,N-dibutylamino)ethyl (meth)acrylate, 3-(N,N-diethylamino)propyl (meh)acrylate, 2-(N,N-dibutylamino)propyl (meth)acrylate, 3-(N,N-dibutylamino)propyl (meth)acrylate, allyl glycidylether, glycidyl (meth)acrylate, glycidyl crotonate, tetrahydrofurfuryl (meth)acrylate and the like.

The aforementioned undercoating composition is not always required to incorporate a cross-linking agent. When the overcoat is applied to the undercoat, there is a possibility that the organic solvent contained in the overcoat will pass into the undercoat even to an extent of notably degrading the adhesiveness of the overcoat. To preclude this possibility, therefore, it is desirable that the undercoat should contain enough cross-linking agent to intercept the otherwise possible invasion of the organic solvent. Examples of cross-linking agents which are usable in the undercoat composition include polyhydric alcohols such as 1,4-butane diol, glycerol, and polyethylene glycol; melamines such as methylol melamine and alkyl-etherified methylol melamines; polyfunctional epoxy compounds such as ethylene glycol diglycidyl ether, glycerol polyglycidyl ether; alkoxysilane having epoxy group and hydrolyzate. Of these cross-linking agents, particularly desirable are alkyl-etherified methylol melamines such as hexa(methoxymethyl) melamine and hexa(butoxymethyl) malamine. These cross-linking agents may be used either independently of one another or in the form of a mixture of two or more members. When alkyl-etherified methylol melamines are used, the amount of the cross-linking agent to be used in this invention falls in the range of from 0.05 to 0.7 equivalent weight, preferably from 0.1 to 0.4 equivalent weight, based on one equivalent weight of the functional group (carboxylic group, amino group, substituted amino group, hydroxyl group, epoxy group or tetra-hydroxyl group) present in the aforementioned polymer (i) or polymer (ii).

Examples of the cross-linking catalyst usable with the cross-linking agent described above include hydrochloric acid, ammonium chloride, ammonium nitrate, ammonium thiocyanate, ammonium perchlorate, triethylamine, N,N-dimethylamino propylamine and stannous octoate. Generally, the amount of the cross-linking catalyst to be used falls within the range of from 0.05 to 0.8 gram equivalent to 1 gram equivalent of the cross-linking agent. The cross-linking catalyst may be used without the cross-linking agent.

The undercoating composition, immediately before use, is diluted to a concentration befitting the work of application to the substrate. Examples of diluents usable for this purpose include methanol and other alcohols, methyl cellulose and other ethers, methylethyl ketone and other ketones, and methyl acetate and other esters. These diluents may be used either independently of one another or in the form of a mixture of two or more members. The extent of this dilution is desired to be such that the concentration of the aforementioned polymer (i) or polymer (ii) falls within the range of from 0.1 to 25 by weight, preferably from 0.5 to 15% by weight.

Optionally, the undercoating composition may contain therein an ordinary paint additive such as a flow control agent in a small amount.

The undercoat film can be formed on the shaped substrate of a polycarbonate type resin by preparing a composition consisting preponderantly of the aforementioned polymer (i) or polymer (ii) and optionally incorporating therein a cross-linking agent, a cross-linking catalyst, a diluent and a flow control agent, applying this composition to the surface of the shaped substrate, drying the resultant layer of composition and optionally treating the dried undercoat layer at a temperature lower than the temperature at which the shaped resin substrate is thermally deformed. The thickness of the undercoat film is desired to fall within the range of from 0.1 to 3 micron.

Now, the present invention will be described further in detail with reference to working examples, which are illustrative of and not limitative in the least of this invention. In the examples, the non-fogging property was determined by first retaining a given test piece at $-10°$ C., then allowing it to stand in an atmosphere under the conditions of 22° C. and 60% of RH and noting whether or not the surface of the test piece was fogged. The resistance to scratch was determined by rubbing a given test piece with a brass wire brush (of the type having whiskers implanted in four rows) and noting how difficult it was for the brush to inflict scratches to the surface. This resistance was rated on the A-B-C scale, wherein:

A stands for perfect resistance such that no scraches were inflicted even by strong rubbing B stands for fair resistance such that scratches were slightly inflicted by strong rubbing.

C stands for poor resistance such that cratches were inflicted even by weak rubbing.

The resistance to hot water was determined by immersing a given test piece under boiling water for one hour and examining it in open air to note whether or not the condition of the film was affected by the boiling water.

EXAMPLES 1-10 AND CONTROLS 1-6

(1) Preparation of solution of partial hydrolyzate of γ-glycidoxypropyl trimethoxy silane (A-1)

In 68.4 parts of ethyl cellosolve was dissolved 100.0 parts of γ-glycidoxypropyl trimethoxy silane. To the solution, 34.2 parts of an aqueous 0.1N hydrochloric acid solution was gradually added. The mixture was stirred at room temperature to induce hydrolysis. Thereafter, the resultant mixture was allowed to stand and age at room temperature for more than 20 hours. The solution consequently obtained was colorless and transparent and was found to contain 35% by weight of the γ-glycidoxy-propyl trimethoxy silane hydrolyzate calculated as

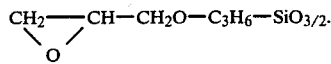

(2) Preparation of solution of partial hydrolyzate of β-(3,4-epoxy-cyclohexyl)ethyl trimethoxy silane (A-2)

In 73.2 parts of ethyl cellosolve was dissolved 100.0 parts of β-(3,4-epoxy-cyclohexyl)ethyl trimethoxy silane. To the solution, 32.8 parts of an aqueous 0.01N hydrochloric acid solution was gradually added. The mixture was stirred at room temperature to induce hydrolysis. Thereafter, the resultant mixture was allowed to stand and age at room temperature for more than 20 hours. The solution consequently obtained was colorless and transparent and was found to contain 35% by weight of β-(3,4-epoxy-cyclohexyl)ethyl trimethoxy silane hydrolyzate calculated as

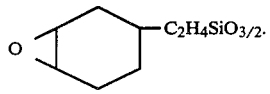

(3) Preparation of solution of partial cohydrolyzate of γ-glycidoxypropyl trimethoxy silane and β-(3,4-epoxycyclohexyl)ethyl trimethoxy silane (A-3)

In 70.2 parts of ethyl cellosolve were dissolved 70 parts of γ-glycidoxypropyl trimethoxy silane and 30 parts of β-(3,4-epoxy-cyclohexyl)ethyl trimethoxy silane. To the solution, 34.0 parts of an aqueous 0.1N hydrochloric acid solution was gradually added. The mixture was stirred at room temperature to include hydrolysis. Thereafter, the resultant mixture was allowed to stand and age at room temperature for more than 20 hours. The solution consequently obtained was colorless and transparent and was found to contain 24.3% by weight of γ-glycidoxypropyl trimethoxysilane hydrolyzate calculated as

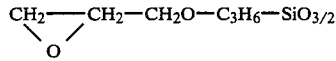

and 10.6% by weight of γ-(3,4-epoxy-cyclohexyl)ethyl trimethoxy silane hydrolyzate calculated as

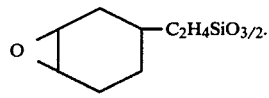

(4) Unhydrolyzed γ-glycidoxy-propyl trimethoxy silane (A-4)

(5) Polyhydric alcohols containing an ethylene oxide chain (B-1 through B-4), indicated in Table 1 below.

TABLE 1

| Solution No. | Polyhydric alcohol containing ethylene oxide chain | Molecular weight |
| --- | --- | --- |
| B-1 | Polyoxyethylated glycerol | 520 |
| B-2 | Polyoxyethylated sorbitol | 850 |
| B-3 | Polyoxyethylated sorbitol | 2500 |
| B-4 | Polyethylene glycol | 300 |

(6) Preparation of solution of copolymer of glycidyl methacrylate (60 parts by weight) and hydroxyethyl methacrylate (40 parts by weight) (C-1)

To 140 g of ethyl cellosolve were added 36 g of glycidyl methacrylate, 24 g of hydroxyethyl methacrylate and 3.0 g of azo-bis-isobutyronitrile (AIBN). The mixture was gently stirred and heated up to 90° C. During this treatment, nitrogen was continuously blown into the reaction system for about four hours. Consequently obtained was a light yellow solution measuring approximately 90 centipoises in viscosity (molecular weight about 20,000). Thus, a copolymer of glycidyl methacrylate and hydroxyethyl methacrylate was formed.

(7) Preparation of solution of copolymer of 3,4-epoxybutyl methacrylate (70 parts by weight), methyl methacrylate (15 parts by weight) and hydroxyethyl methacrylate (15 parts by weight) (C-2)

To 140 g of ethyl cellosolve were added 42 g of 3,4-epoxybutyl methacrylate, 9 g of methyl methacrylate, 9 g of hydroxyethyl methacrylate and 0.3 g of AIBN. The mixture was gently stirred and heated up to 90° C. During this treatment, nitrogen was continuously blown into the reaction system for more than about four hours. Consequently obtained was a light yellow solution measuring approximately 80 CPS in viscosity (molecular weight about 18,000). Thus a copolymer of 3,4-epoxybutyl methacrylate, methyl methacrylate and hydroxyethyl methacrylate was formed.

(8) Preparation of solution of copolymer of glycidyl methacrylate (15 parts by weight), ethyl methacrylate (50 parts by weight) and hydroxyethyl methacrylate (35 parts by weight) (C-3)

To 140 g of ethyl cellosolve were added 9 g of glycidyl methacrylate, 30 g of ethyl methacrylate, 21 g of hydroxyethyl methacrylate and 0.3 g of AIBN. The mixture was gently stirred and heated up to 90° C. During this treatment, nitrogen was continuously blown into the reaction system for about four hours. Consequently obtained was a light yellow solution measuring about 100 CPS in viscosity (molecular weight about 20,000). Thus, a copolymer of glycidyl methacrylate, ethyl methacrylate and hydroxyethyl methacrylate was formed. This copolymer contained 15% by weight of repeating structural units represented by the general formula

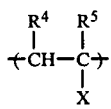

(9) Ammonium perchlorate (D-1) and aluminum acetyl acetonate (D-2) were used as the curing catalyst.

(10) Of the various nonionic active agents, an active agent of the polyoxyethylene alkyl aryl type (produced by Lion Oils and Fats Co., and marketed under trademark designation of Liponox NCN) (E-1) and an active agent of the polyoxyethylene sorbitane ester type (produced by Nippon Oils and Fats Co., and marketed under trademark designation of Nissan Nonion LT-221) (E-2) were used as the surface active agent.

(11) Preparation of paints

The epoxy group-containing organic silane compounds and/or partial hydrolyzates thereof (A-1 through A-4), the polyhydric alcohols containing an ethylene oxide chain (B-1 through B-4) and the vinyl polymers or copolymers containing an epoxy group (C-1 through C-3) mentioned above were mixed in the varying proportions indicated in Table 2, with the curing catalysts (D-1 and D-2) and optionally the surface active agents (E-1 and E-2) added thereto in the proportions also indicated in Table 2 and a flow control agent further added thereto in small amount. The resultant mixtures were diluted with ethyl cellosolve so that their solids contents fell within the range of from 20 to 50% by weight.

(12) Coating

Diethylene glycol bis-allyl carbonate plates 3 mm in thickness washed in advance were coated with the paints mentioned above by the immersion method and were heated at 130° C. for one hour to cure the applied coats.

The films were tested for properties. The results are collectively shown in Table 2.

TABLE 2

| Example No. | Component (A) Code | Weight | Component (B) Code | Weight | Component (C) Code | Weight | Curing Catalyst Code | Weight |
|---|---|---|---|---|---|---|---|---|
| Example | | | | | | | | |
| 1 | A-1 | 28.6 (10) | B-1 | 50(50) | C-1 | 133.3 (40) | D-1 | 1.0 |
| 2 | A-2 | 114.3 (40) | B-2 | 40(40) | C-1 | 66.6 (20) | D-1 | 1.0 |
| 3 | A-3 | 85.7 (30) | B-2 | 30(30) | C-1 | 133.3 (40) | D-1 | 1.0 |
| 4 | A-1 | 57.1 (20) | B-2 | 50(50) | C-1 | 100 (30) | D-2 | 1.0 |
| 5 | A-1 | 57.1 (20) | B-4 | 60(60) | C-1 | 66.6 (20) | D-2 | 1.0 |
| 6 | A-1 | 114.3 (40) | B-1 | 30(30) | C-2 | 100 (30) | D-1 | 1.0 |
| 7 | A-1 | 57.1 (20) | B-2 | 30(30) | C-2 | 166.6 (50) | D-1 | 1.0 |
| 8 | A-3 | 57.1 (20) | B-1 | 40(40) | C-1 | 133.3 (40) | D-1 | 1.0 |
| 9 | A-4 | 171.4 (60) | — | | C-1 | 166.6 (50) | D-1 | 1.0 |
| Control | | | | | | | | |
| 1 | A-1 | 171.4 (60) | — | | C-1 | 133.3 (40) | D-1 | 1.0 |
| 2 | — | | B-2 | 50(50) | C-2 | 166.6 (50) | D-1 | 1.0 |
| 3 | A-1 | 171.4 (60) | B-1 | 20(20) | C-1 | 66.6 (20) | D-1 | 1.0 |
| 4 | A-1 | 28.6 (10) | B-1 | 80(80) | C-1 | 33.3 (10) | D-1 | 1.0 |
| 5 | A-1 | 28.6 (10) | B-2 | 10(10) | C-1 | 266.7 (80) | D-1 | 1.0 |
| Example | | | | | | | | |
| 10 | A-1 | 57.1 (20) | B-3 | 50(50) | C-1 | 100 (30) | D-1 | 1.0 |
| Control | | | | | | | | |
| 6 | A-1 | 85.7 (30) | B-2 | 50(50) | C-3 | 66.6 (20) | D-1 | 1.0 |

| Example No. | Surface active agent Code | Weight | Non-fogging property | Resistance to scratch | Resistance to hot water Appearance | Resistance to hot water wear |
|---|---|---|---|---|---|---|
| Example | | | | | | |
| 1 | | | No fogging formed | A | Normal | A |
| 2 | | | No fogging formed | A | " | A |
| 3 | | | No fogging formed | A | " | A |
| 4 | | | No fogging formed | A | " | A |
| 5 | | | No fogging formed | A-B | " | A-B |
| 6 | E-1 | 15.0 | No fogging formed | A | " | A |
| 7 | E-2 | 10.0 | No fogging formed | A | " | A |
| 8 | E-1 | 10.0 | No fogging formed | A | " | A |
| 9 | | | No fogging formed | A | " | A |
| Control | | | | | | |
| 1 | | | fogging formed | A | " | A |
| 2 | | | No fogging formed | B | " | B-C |
| 3 | | | fogging formed | A | Bough surface | A |
| 4 | E-1 | 10.0 | No fogging formed | C | | C |
| 5 | | | fogging formed | No smooth film formed | — | — |
| Example | | | | | | |
| 10 | | | No fogging formed | A-B | Normal | B |
| Control | | | | | | |
| 6 | | | No fogging formed | B | " | B |

The numeral values in parentheses are weight proportions based on the total of components taken as 100.

EXAMPLE 11

A non-fogging substrate produced by faithfully following the procedure of Example 7 was kept at a distance of about 50 mm from a container holding therein an anthraquinone type disperse dye (produced by Sumitomo Chemical Industry Co., Ltd., and marketed under trademark designation of Sumikalon Blue E-FBL) finely pulverized in advance with a mortar.

A bell jar placed to cover the substrate and the dye container was closed airtightly and evacuated of the inner air by a vacuum pump to a pressure of 0.5 Torrs. The heater for the dye container was switched on to raise the temperature of the container up to 200° C. and hold it at that temperature for 10 minutes to vaporize the dye. The coated substrate set in position within the bell jar was rotated about its center at a constant rate of 60 turns per minute within the vapor of the dye to prevent the film from being unevenly colored. Consequently there was obtained a substrate having an evenly dyed blue, non-fogging coat on one surface thereof. This substrate possessing a blue, non-fogging coat showed the same degrees of non-fogging property, scratch resistance and hot-water resistance as that obtained in Example 7. In the color fastness test (JIS L-0842-1971) (hereinafter referred to as "fade test") conducted under the light of a carbon arc for 200 hours, the substrate retained perfect color fastness showing substantially no sign of fading.

EXAMPLE 12

A non-fogging substrate produced by faithfully following the procedure of Example 6 was immersed in a dye bath containing 90 g of a polyoxyethylene alkyl aryl type surface active agent (produced by Lion Oils and Fats Co., Ltd., and marketed under trademark designation of Liponox NCO) and 10 g of an anthraquinone type disperse dye (produced by Sumitomo Chemical Industry Co., Ltd., and marketed under trademark designation of Sumikalon Blue E-FBL), at 95° C. for five minutes. Consequently, there was obtained a substrate possessing a uniformly dyed, transparent blue coat. This substrate possessing a colored, non-fogging coat showed the same degrees of non-fogging, scratch resistance and hot-water resistance as the substrate of Example 6. After a 200 hours' fade test, it retained perfect color fastness showing substantially no sign of fading.

EXAMPLE 13-24 AND CONTROLS 7-10

The polymers or copolymers possessing an epoxy group (C-1 through C-3), the polyhydric alcohols possessing an ethylene oxide chain (B-1 through B-4) and the curing catalysts (D-1 and D-2) prepared by faithfully following the procedure of Examples 1-10, and optionally cross-linking agents containing an epoxy group (F-1 thorugh F-7) indicated in Table 3 and surface active agents (E-1 and E-2) were mixed in the varying proportions shown in Table 4, with a flow control agent added thereto in a small amount. The resultant mixture was diluted with ethyl cellosolve so that the solids contents fell within the range of from 20 to 50% by weight. Thus, paints were obtained.

Diethylene glycol bisallyl carbonate plates 3 mm in thickness cleaned in advance were coated with the paints mentioned above by the immersion method. The coats on the substrates were cured by heating at 130° C. for one hour. The coats were tested for properties. The results are shown collectively in Table 4.

TABLE 3

| Code | Trademark designation | Structure | Producer |
|---|---|---|---|
| F-1 | Sumi-epoxy ELA-128 | Bis-phenol A-epichlorohydrin type | Sumitomo Chemical Industry Co., Ltd. |
| F-2 | Sumi-epoxy ESA-014 | Bis-phenol A-epichlorohydrin type | Sumitomo Chemical Industry Co., Ltd. |
| F-3 | Denacol EX-313 | Glycerol polyglycidyl ether | Nagase Sangyo Co., Ltd. |
| F-4 | Denacol EX-611 | Sorbitol polyglycidyl ether | Nagase Sangyo Co., Ltd. |
| F-5 | Epolite 100 MF | Trimethylol propane polyglycidyl ether | Kyoeisha Oils and Fats Co., Ltd. |
| F-6 | Chissonox 221 | Cyclohexene oxide type | Chisso Co., Ltd. |
| F-7 | Sumi-epoxy ELM-434 | N,N,N',N'—tetraglycidyl DDM | Sumitomo Chemical Industry Co., Ltd. |

TABLE 4

| Example No. | Component (C) Code | Weight | Component (B) Code | Weight | Cross-linking Abent Code | Weight | Curing catalyst Code | Weight |
|---|---|---|---|---|---|---|---|---|
| Example | | | | | | | | |
| 13 | C-1 | 150(45) | B-1 | 55(55) | F-1 | 11(11) | D-1 | 1.1 |
| 14 | C-1 | 110(33) | B-2 | 67(67) | F-2 | 67(67) | D-1 | 1.7 |
| 15 | C-1 | 167(50) | B-2 | 50(50) | F-3 | 25(25) | D-1 | 1.3 |
| 16 | C-1 | 83(25) | B-4 | 75(75) | F-3 | 25(25) | D-1 | 1.3 |
| 17 | C-2 | 167(50) | B-2 | 50(50) | F-4 | 67(67) | D-1 | 1.7 |
| 18 | C-2 | 210(63) | B-2 | 37(37) | F-5 | 25(25) | D-1 | 1.3 |
| 19 | C-2 | 183(55) | B-1 | 45(45) | F-5 | 11(11) | D-1 | 1.1 |
| 20 | C-1 | 190(57) | B-1 | 43(43) | F-6 | 43(43) | D-2 | 1.4 |
| 21 | C-1 | 127(37) | B-1 | 63(63) | F-7 | 25(25) | D-1 | 1.2 |
| 22 | C-1 | 167(50) | B-2 | 50(50) | — | — | D-1 | 1.0 |
| 23 | C-2 | 200(60) | B-2 | 40(40) | — | — | D-1 | 1.0 |
| Control | | | | | | | | |
| 7 | C-1 | 267(80) | B-1 | 20(20) | — | — | D-1 | 1.0 |
| 8 | C-2 | 33(10) | B-1 | 90(90) | — | — | D-1 | 1.0 |
| 9 | C-1 | 37(11) | B-1 | 89(89) | F-6 | 11(11) | D-1 | 1.1 |
| Example | | | | | | | | |
| 24 | C-1 | 143(43) | B-3 | 57(57) | F-3 | 43(43) | D-1 | 1.4 |
| Control | | | | | | | | |
| 10 | C-3 | 167(50) | B-1 | 50(50) | F-4 | 25(25) | D-1 | 1.2 |

| Example No. | Surface active Agent Code | Weight | Non-fogging property | Resistance to scratch | Resistance to hot water Appearance | Resistance wear |
|---|---|---|---|---|---|---|
| Example | | | | | | |
| 13 | | | No-fogging formed | A | Normal | A |
| 14 | | | No-fogging formed | A–B | " | A–B |
| 15 | | | No-fogging formed | A | " | A |
| 16 | E-1 | 13 | No-fogging formed | A–B | " | A–B |
| 17 | E-1 | 26 | No- | A | " | A |

TABLE 4-continued

| | | | fogging formed | | | |
|---|---|---|---|---|---|---|
| 18 | | | No-fogging formed | A | " | A |
| 19 | E-2 | 11 | No-fogging formed | A | " | A |
| 20 | | | No-fogging formed | A | " | A |
| 21 | | | No-fogging formed | A–B | " | A–B |
| 22 | | | No-fogging formed | A–B | " | A–B |
| 23 | | | No-fogging formed | A | " | A–B |
| Control | | | | | | |
| 7 | | | fogging formed | A | " | A |
| 8 | | | No fogging formed | C | Rogh surface | C |
| 9 | | | No fogging formed | C | Rogh surface | C |
| Example | | | | | | |
| 24 | | | No fogging formed | A–B | Normal | B |
| Control | | | | | | |
| 10 | | | No fogging formed | B | " | B–C |

The numerical values in parentheses are proportions of solids content polymerized, based on the total of (C)+(B) taken as 100.

EXAMPLE 25

A paint was prepared by following the procedure of Example 15 of Table 4, except that a mixture of 12.5 parts by weight of the cross-linking agent F-3 and 12.5 parts by weight of a hydrolyzate of γ-glycidoxypropyl trimethoxy silane (calculated as $RSiO_{1.5}$) was used in the place of 25 parts by weight of the cross-linkg agent F-3. A diethylene glycol bisallyl carbonate plate 3 mm in thickness cleaned in advance was coated with this paint by the immersion method. The coat thus formed was cured by heating at 130° C. for one hour. In the test for non-fogging property, resistance to scratch and resistance to hot water, this coat showed good results.

EXAMPLE 26

A non-fogging substrate produced by faithfully following the procedure of Example 19 was kept at a distance of about 50 mm from a dye container holding therein an anthraquinone type disperse dye (produced by Sumitomo Chemical Industry Co., Ltd., and marketed under trademark designation of Sumikalon E-FBL) finely pulverized in advance.

A bell jar was placed to cover the coated substrate and the dye container, closed airtightly and evacuated of the inner air by a vacuum pump to a pressure of 0.5 Torrs. Then the heater for the dye container was switched on to raise the container's temperature up to 200° C. and hold it at that level for 10 minutes to vaporize the dye. The non-fogging substrate set in position within this bell jar was rotated about its center at a constant rate of 60 turns per minute in the vapor of the dye so as to prevent the film from being unevenly dyed. Consequently there was obtained a substrate having a uniformly colored, blue non-fogging film on one surface thereof. The substrate possessing the colored non-fogging coat showed the same degree of non-fogging, scratch resistance and hot-water resistance as the coated substrate of Example 19. After a 200 hours' fade test, it retained perfect color fastness showing substantially no sign of fading.

EXAMPLE 27

A non-fogging substrate produced by faithfully following the procedure of Example 18 was immersed in a dye bath consisting of 90 g of a polyoxy-ethylene alkyl aryl type surface active agent (produced by Lion Oils and Fats Co., Ltd., and marketed under trademark designation of Liponox NCO) and 10 g of an anthraquinone type disperse dye (produced by Sumitomo chemical Industry Co., Ltd., and marketed under trademark designation of Sumikalon blue E-FBL) at 95° C. for five minutes. Consequently there was obtained a substrate having a uniformly dyed, blue transparent non-fogging coat. This substrate having the dyed, non-fogging coat possessed the same degree of non-fogging scratch resistance and hot-water resistance as the coated substrate of Example 18. After a 200 hours fade test, it retained perfect color fastness showing substantially no fading.

EXAMPLES 28–37 AND CONTROLS 11–13

A. Undercoat layer (1) Preparation of solution of copolymer of 2-hydroxyethyl methacrylate (36 parts by weight), dimethylamino-ethyl methacrylate (14 parts by weight) and methyl methacrylate (50 parts by weight) (U-1)

To 320 g of ethyl cellosolve were added 36 g of 2-hydroxyethyl methacrylate, 14 g of dimethylamino-ethyl methacrylate, 50 g of methyl methacrylate and 0.4 g of azo-bis-isobutyronitrile. The resultant mixture was stirred under an atmosphere of nitrogen at 90° C. for four hours to effect copolymerization of the monomers. Thus was obtained a light yellow solution having a molecular weight of about 22,000. A copolymer of 2-hydroxyethyl methacrylate, dimethylaminoethyl methacrylate and methyl methacrylate was thus obtained.

(2) Preparation of other copolymers and homopolymer (U-2 through U-6)

The various copolymers or homopolymer, U-2 through U-6, indicated in Table 5 were prepared by following the procedure of (1).

TABLE 5

| Type | | Parts by weight | Type | Parts by weight | Type | Parts by weight |
|---|---|---|---|---|---|---|
| U-2 | 2-Hydroxyethyl methacrylate | 95 | Dimethylaminoethyl methacrylate | 5 | — | — |
| U-3 | 2-Hydroxyethyl methacrylate | 51.5 | Acrylic acid | 28.5 | — | — |
| U-4 | 2-Hydroxyethyl methacrylate | 38 | Glycidyl methacrylate | 42 | — | — |

TABLE 5-continued

| Type | | Parts by weight | Type | Parts by weight | Type | Parts by weight |
|---|---|---|---|---|---|---|
| U-5 | Acrylamide | 50 | — | — | — | — |
| U-6 | Acrylamide | 20 | Tetra-hydro-furfuryl methacrylate | 20 | Methyl methacrylate | 60 |

(3) Preparation of paint

The copolymers and homopolymer mentioned above were mixed in the proportions indicated in Table 6 with the cross-linking agent and curing catalyst added as required in the proportions similarly indicated in Table 6 and a small amount of a flow control agent further incorporated therein. The resultant mixtures were diluted with ethyl cellosolve so that their solids contents fell within the range of from 1.0 to 10.0% by weight.

(4) Application to substrate

Polycarbonate plates 1 mm in thickness cleaned in advance were coated with the aforementioned undercoating paints by the immersion method. The undercoats thus formed were cured by heating at 130° C. for 20 minutes.

B. Overcoat layer (1) Preparation of Paint

The epoxy group-containing organic silane compound and partial hydroxylate thereof (A-1 and A-2), the polyhydric alcohols having an ethylene oxide chain (B-1 through B-4), and the vinyl polymer and copolymer having an epoxy group (C-1 and C-3) prepared by following the procedure of Examples 1–10 were mixed in the proportions indicated in Table 6, with the curing catalyst and optionally the surface active agent added thereto in the proportions also indicated in Table 6 and a small amount of a flow control agent additionally incorporated therein. The resultant mixture was diluted with ethyl cellosolve so that solids contents fell within the range of from 20 to 50% by weight.

(2) Application to substrate

The undercoated polycarbonate plates 1 mm in thickness were coated with the aforementioned overcoating paints by the immersion method. The overcoats thus formed were cured by heating at 130° C. for one hour. The coats were tested for properties.

The results are collectively shown in Table 7

TABLE 6

| Example, Control No. | Undercoat composition | | | | | | Overcoat composition | |
|---|---|---|---|---|---|---|---|---|
| | Polymer | | Cross-linking agent | | Curing catalyst | | Component (A) | |
| | Code | Part by Weight | Type | Part by Weight | Type | Part by Weight | Code | Part by weight |
| Example | | | | | | | | |
| 28 | U-1 | 100 | HMMM[1] | 1.4 | NH4Cl | 0.19 | A-1 | 28.6(10) |
| 29 | U-2 | 100 | — | — | — | — | A-2 | 114.3(40) |
| 30 | U-3 | 100 | A-187[2] | 3.5 | NH4ClO4 | 0.75 | A-1 | 85.7(30) |
| 31 | U-4 | 100 | A-1100[3] | 3.5 | NH4ClO4 | 0.80 | A-1 | 114.3(40) |
| 32 | U-5 | 100 | — | — | — | — | A-1 | 57.1(20) |
| 33 | U-6 | 100 | — | — | — | — | A-2 | 57.1(20) |
| 34 | U-2 | 10 | — | — | — | — | A-1 | 57.1(20) |
| | U-4 | 90 | | | | | | |
| 35 | U-1 | 100 | — | — | — | — | A-2 | 114.3(40) |
| 36 | U-4 | 100 | — | — | DMAPA[4] | 0.02 | A-1 | 57.1(20) |
| 37 | U-5 | 100 | Ex314[4] | 1.5 | NH4ClO4 | 0.2 | A-1 | 85.7(30) |
| Control | | | | | | | | |
| 11 | — | — | — | — | — | — | A-1 | 28.6(10) |
| 12 | — | — | — | — | — | — | A-2 | 114.3(40) |
| 13 | — | — | — | — | — | — | A-1 | 171.4(60) |

| Example Control No. | Overcoat composition | | | | | | | |
|---|---|---|---|---|---|---|---|---|
| | Component (B) | | Component (C) | | Curing catalyst | | Surface active agent | |
| | Code | Part by weight | Code | Part by weight | Code | Part by weight | Code | Part by weight |
| Example | | | | | | | | |
| 28 | B-1 | 50(50) | C-1 | 133.3(40) | D-1 | 1.0 | — | — |
| 29 | B-2 | 40(40) | C-1 | 66.6(20) | D-1 | 1.0 | E-1 | 15.0 |
| 30 | B-3 | 20(20) | C-2 | 166.6(50) | D-1 | 1.0 | — | — |
| 31 | B-4 | 40(40) | C-1 | 66.6(20) | D-1 | 1.0 | E-2 | 10.0 |
| 32 | B-2 | 30(30) | C-2 | 166.6(50) | D-2 | 1.0 | — | — |
| 33 | B-1 | 40(40) | C-1 | 133.3(40) | D-2 | 1.0 | E-1 | 8.0 |
| | | | | | | | E-2 | 4.0 |
| 34 | B-1 | 30(30) | C-2 | 166.6(50) | D-1 | 1.0 | E-2 | 10.0 |
| 35 | B-2 | 30(30) | C-2 | 100(30) | D-1 | 1.0 | — | — |
| 36 | B-2 | 30(30) | C-1 | 166.6(50) | D-1 | 1.0 | E-1 | 10.0 |
| 37 | B-3 | 20(20) | C-1 | 166.6(50) | D-2 | 1.0 | — | — |
| Control | | | | | | | | |
| 11 | B-1 | 50(50) | C-1 | 133.3(40) | D-1 | 1.0 | — | — |
| 12 | B-2 | 40(40) | C-1 | 66.6(20) | D-1 | 1.0 | E-1 | 15.0 |

TABLE 6-continued

| | | | | | | | | |
|---|---|---|---|---|---|---|---|---|
| 13 | B-2 | 20(20) | C-2 | 66.6(20) | D-2 | 1.0 | — | — |

[1] Hexamethoxy-methyl melamine
[2] γ-Glycidoxypropyl trimethoxy silane
[3] γ-Aminopropyl triethoxy silane
[4] Glycerol polyglycidyl ether
[5] N,N—dimethylamino-propyl amine
The numerical values in parentheses are proportions by weight based on the total of components taken as 100.

TABLE 7

| Example Control No. | Non-fogging Property | Scratch resistance | Adherency | Hot-Water-resistance Appearance | Hot-Water-resistance Scratch resistance |
|---|---|---|---|---|---|
| Example | | | | | |
| 28 | No fogging formed | A | 100/100 | Normal | A |
| 29 | No fogging formed | A | 100/100 | " | A |
| 30 | No fogging formed | A | 100/100 | " | A |
| 31 | No fogging formed | A | 100/100 | " | A |
| 32 | No fogging formed | A | 100/100 | " | A |
| 33 | No fogging formed | A | 100/100 | " | A |
| 34 | No fogging formed | A | 100/100 | " | A |
| 35 | No fogging formed | A | 100/100 | " | A |
| 36 | No fogging formed | A | 100/100 | " | A |
| 37 | No fogging formed | A | 100/100 | " | A |
| Control | | | | | |
| 11 | No fogging formed | A | 0/100 | Film peeled | — |
| 12 | No fogging formed | A | 0/100 | Film peeled | — |
| 13 | fogging formed | A | 0/100 | Film peeled | — |

The adherency was determined by the cross-cut tape test, i.e. by inserting 11 straight cuts parallelly at fixed intervals of 1 mm each in two perpendicularly intersecting directions to form 100 cross-cut squares on the surface of the film, applying a cellophane adhesive tape to the film, lifting the tape from the film and taking count of the squares of film remaining unpeeled. The adherency was reported by this number of unpeeled squares. The hot-water resistance was determined by immersing a given test piece in boiling water for 30 minutes and subsequently examining the coat to note how the hot water had affected the coat.

EXAMPLES 38–47 AND CONTROLS 14–16

A. Undercoat layer

Polymers and copolymers were prepared by following the procedure of Examples 28–37 (U-1 through U-6). By following the procedure of Examples 28–37, these polymers and copolymers and other components were mixed in the proportions indicated in Table 8 to produce undercoat paints. Thereafter, polycarbonate plates 1 mm in thickness cleaned in advance were coated with these undercoat paints by the immersion method. The coats thus formed were cured by heating at 130° C. for 20 minutes.

B. Overcoat Layer

By following the procedure of Examples 1–10, the polymers and copolymers having an epoxy group (C-1 through C-3), the polyhydric alcohols having an ethylene oxide chain (B-1 through B-4) and the curing catalysts (D-1 and D-2) were mixed in the proportions indicated in Table 8, with the cross-linking agents having an epoxy group (F-1 through F-6) and the surface active agents (E-1 and E-2) optionally added thereto in the proportions also indicated in Table 8 and a small amount of a flow control agent additionally incorporated therein. The resultant mixture was diluted with ethyl cellosolve so that the solids contents fell within the range of from 20 to 50% by weight. Consequently, their was obtained overcoat paints. The undercoated polycarbonate plates 1 mm in thickness were coated with the overcoat paints by the immersion method, and the coats thus formed are cured by heating at 130° C. for one hour. They were subjected to the same tests as those of Examples 28–37. The results are collectively shown in Table 9.

TABLE 8

| | Undercoat composition | | | | | | Overcoat composition component (A) | |
|---|---|---|---|---|---|---|---|---|
| | Polymer | | Cross-linking agent | | curing catalyst | | | |
| Example Control No. | Code | Part by weight | Type | Part by weight | Type | Part by weight | Code | Part by weight |
| Example | | | | | | | | |
| 38 | U-1 | 100 | H.M.M.M.[1] | 1.4 | NH4Cl | 0.19 | C-1 | 150(45) |
| 39 | U-2 | 100 | — | — | — | — | C-1 | 110(33) |
| 40 | U-3 | 100 | A-187[2] | 3.7 | NH4ClO4 | 0.72 | C-1 | 167(50) |
| 41 | U-4 | 100 | A-1100[3] | 3.5 | NH4ClO4 | 0.70 | C-1 | 83(25) |
| 42 | U-5 | 100 | — | — | — | — | C-2 | 183(55) |
| 43 | U-6 | 100 | — | — | — | — | C-2 | 167(50) |
| 44 | U-4 | 100 | — | — | DMAPA[4] | 0.11 | C-2 | 127(37) |
| 45 | U-6 | 100 | — | — | TEA[5] | 0.05 | C-1 | 190(57) |
| 46 | U-2 | 10 | — | — | — | — | C-1 | 167(50) |
| | U-4 | 90 | | | | | | |
| 47 | U-2 | 30 | — | — | — | — | C-2 | 200(60) |

TABLE 8-continued

|  | U-6 | 70 |  |  |  |  |  |  |  |
|---|---|---|---|---|---|---|---|---|---|
| Control |  |  |  |  |  |  |  |  |  |
| 14 | — | — | — |  | — | — |  | C-1 | 110(33) |
| 15 | — | — | — |  | — | — |  | C-2 | 267(80) |
| 16 | — | — | — |  | — | — |  | C-1 | 167(50) |

| Example Control No. | Overcoat composition | | | | | | | |
|---|---|---|---|---|---|---|---|---|
|  | Component (B) | | Cross-linking agent | | Curing catalyst | | Surface active agent | |
|  | Code | Part by weight | Code | Part by Weight | Code | Part by weight | Code | Part by weight |
| Example |  |  |  |  |  |  |  |  |
| 38 | B-1 | 55(55) | F-1 | 11(11) | D-1 | 1.1 | — | — |
| 39 | B-2 | 67(67) | F-2 | 50(50) | D-1 | 1.5 | E-1 | 15 |
| 40 | B-3 | 50(50) | F-3 | 25(25) | D-1 | 1.3 | — | — |
| 41 | B-4 | 75(75) | F-3 | 25(25) | D-1 | 1.3 | E-2 | 13 |
| 42 | B-2 | 45(45) | F-4 | 11(11) | D-1 | 1.1 | — | — |
| 43 | B-3 | 50(50) | F-5 | 67(67) | D-1 | 1.7 | — | — |
| 44 | B-2 | 63(63) | F-5 | 25(25) | D-1 | 1.3 | E-1 | 10 |
|  |  |  |  |  |  |  | E-2 | 3 |
| 45 | B-1 | 43(43) | F-6 | 43(43) | D-2 | 1.4 | — | — |
| 46 | B-1 | 50(50) | — | — | D-2 | 1.0 | — | — |
| 47 | B-1 | 40(40) | — | — | D-1 | 1.0 | E-2 | 10 |
| Control |  |  |  |  |  |  |  |  |
| 14 | B-2 | 67(67) | F-2 | 50(50) | D-1 | 1.5 | E-1 | 15 |
| 15 | B-2 | 20(20) | — | — | D-1 | 1.0 | — | — |
| 16 | B-1 | 50(50) | — | — | D-1 | 1.0 | — | — |

[1]Hexamethoxymethyl melamine
[2]γ-Glycidoxy-propyl trimethoxy silane
[3]γ-Aminopropyl triethoxy silane
[4]N,N—dimethylamino propylamine
[5]Triethanolamine
The numerical values in parentheses are weight proportions of solids based on the total weight of the components (A) + (B) taken as 100.

TABLE 9

| Example Control No. | Non-fogging property | Scratch resistance | Adherency | Hot-Water resistance | |
|---|---|---|---|---|---|
|  |  |  |  | Appearance | Scratch resistance |
| Example |  |  |  |  |  |
| 38 | No fogging formed | A | 100/100 | Normal | A |
| 39 | No fogging formed | A-B | 100/100 | " | A-B |
| 40 | No fogging formed | A | 100/100 | " | A |
| 41 | No fogging formed | A-B | 100/100 | " | A-B |
| 42 | No fogging formed | A | 100/100 | " | A |
| 43 | No fogging formed | A | 100/100 | " | A |
| 44 | No fogging formed | A-B | 100/100 | " | A-B |
| 45 | No fogging formed | A | 100/100 | " | A |
| 46 | No fogging formed | A-B | 100/100 | " | A-B |
| 47 | No fogging formed | A | 100/100 | " | A-B |
| Control |  |  |  |  |  |
| 14 | No fogging formed | A-B | 0/100 | Film peeled | — |
| 15 | Fogging formed | A | 0/100 | Film peeled | — |
| 16 | No fogging formed | A-B | 0/100 | Film peeled | — |

What is claimed is:

1. A coated shaped article of a polycarbonate type resin combining resistance to wear and non-fogging property, which article comprises:
   (I) a substrate of a polycarbonate type resin,
   (II) layer of undercoat formed by applying to the surface of the substrate and allowing to cure thereon a composition containing a polymer selected from the group consisting of:
   (i) a polymer possessing repeating structural units represented by the general formula (3):

(3)

wherein, $R^6$ and $R^7$ independently stand for a hydrogen atom, an alkyl group having 1 to 5 carbon atoms or a carboxyl group and Y stands for a side chain containing a carboxyl group, an amino group or an epoxy group and
   (ii) a polymer possessing repeating structural units represented by the formula (4):

(4)

wherein, $R^8$ and $R^9$ independently stand for a hydrogen atom, a lower alkyl group or a carboxyl group and Z stands for a side chain containing a hydroxyl group and repeating structural units represented by the formula (5):

$$\begin{array}{cc} R^{10} & R^{11} \\ | & | \\ \text{-CH-C-} \\ & | \\ & W \end{array} \quad (5)$$

wherein, $R^{10}$ and $R^{11}$ independently stand for a hydrogen atom, a lower alkyl group or a carboxyl group and W stands for a side chain containing a carboxyl group, an alkoxy-carbonyl group, an amino group, a substituted amino group, an epoxy group or a tetrahydrofuryl group) and (III) a layer of overcoat formed by applying to the surface of the undercoat and allowing to cure thereon a nonfogging coating composition, comprising:

(A) 0 to 50 parts by weight (calculated as $$\begin{array}{c} R_b^2 \\ | \\ R_a^1\text{—Si—O}_{\frac{4-a-b}{2}} \end{array})$$

of at least one compound selected from the group consisting of epoxy group-containing organic silane compounds represented by the general formula (1):

$$\begin{array}{c} R_b^2 \\ | \\ R_a^1\text{—Si—}(OR^3)_{4-a-b} \end{array} \quad (1)$$

wherein, $R^1$ stands for an organic group having an epoxy group, $R^2$ for a hydrogen atom, a hydrocarbon group having 1 to 6 carbon atoms or a vinyl group, $R^3$ for a hydrocarbon group having 1 to 5 carbon atoms, an alkoxy-alkyl group or an acyl group having 1 to 4 carbon atoms, a for an integer having the value of 1 to 3 and b for an integer having the value of 0 to 2, providing that $a+b \leq 3$ is satisfied, and partial hydrolyzates thereof, (B) 20 to 80 parts by weight of a polyhydric alcohol having an ethylene oxide chain, (C) 10 to 75 parts by weight of a polymer or copolymer containing at least 20% by weight of repeating structural units represented by the general formula (2):

$$\begin{array}{cc} R^4 & R^5 \\ | & | \\ \text{-CH-C-} \\ & | \\ & X \end{array} \quad (2)$$

wherein, $R^4$ and $R^5$ independent by stand for a hydrogen atom, a lower alkyl group or a carboxyl group and X stands for a side chain possessing an epoxy group, and (D) a catalytic amount of a curing catalyst, providing that the total of the amounts of the aforementioned components (A), (B) and (C) is 100 parts by weight.

2. A shaped article according to claim 1, wherein the repeating structural units represented by the general formula (2) are contained by at least 40% by weight in said polymer or copolymer (C).

3. A shaped article according to claim 1, which comprises (A) 5 to 30 parts by weight of at least one compound selected from the group consisting of epoxy group-containing organic silane compounds represented by the general formula (1) and partial hydrolyzates thereof, (B) 30 to 50 parts by weight of a polyhydric alcohol having an ethylene oxide chain and (C) 30 to 50 parts by weight of a polymer or copolymer containing at least 20% by weight of repeating structural units represented by the general formula (2).

4. A shaped article according to claim 3, which comprises (A) 5 to 15 parts by weight of at least one compound selected from the group consisting of epoxy group-containing organic silane compounds represented by the general formula (1), (B) 30 to 50 parts by weight of a polyhydric alcohol having an ethylene oxide chain and (C) 30 to 50 parts by weight of a polymer or copolymer containing at least 20% by weight of repeating structural units represented by the general formula (2).

5. A shaped article according to claim 1, wherein the partial hydrolyzate of the epoxy group-containing organic silane compound represented by the general formula (1) or the mixture of not less than 70% by weight of said partial hydrolyzate with the balance to make up 100% by weight of said organic silane compound accounts for a proportion falling within the range of from 15 to 50 parts by weight.

6. A shaped article according to claim 1, wherein the epoxy group-containing organic silane compound is glycidoxy alkyl trialkoxy silane.

7. A shaped article according to claim 1, wherein the polyhydric alcohol having an ethylene oxide chain has a molecular weight within the range of from 100 to 3000.

8. A shaped article according to claim 1, wherein the polyhydric alcohol having an ethylene oxide chain is a compound represented by the general formula:

$$\begin{array}{l} CH_2O\text{-}(CH_2CH_2O)_{\overline{n_1}}\text{-}H \\ | \\ CHO\text{-}(CH_2CH_2O)_{\overline{n_2}}\text{-}H \\ | \\ \vdots \\ CH_2O\text{-}(CH_2CH_2O)_{\overline{n_m}}\text{-}H \end{array}$$

wherein, $n_1$ to $n_m$ independently stand for integers of the values of 0 to 7, at least two of which symbols represent integers of the value of at least 1, and m stands for an integer of the value of 3 to 9.

9. A shaped article according to claim 1, wherein a composition comprising (B) 20 to 80 parts by weight of at least one compound having an ethylene oxide chain, (C) 30 to 50 parts by weight of a polymer or copolymer containing at least 20% by weight of repeating structural units represented by the general formula (2) and (D) a catalytic amount of a curing catalyst is mixed with a cross-linking agent containing 3 to 80 parts by weight, based on 100 parts by weight of said composition, of an epoxy group.

10. A shaped article according to claim 9, wherein the epoxy group-containing cross-linking agent accounts for a proportion within the range of from 5 to 60 parts by weight, based on 100 parts by weight of the total of the components (B) and (C).

11. A shaped article according to claim 1, wherein the curing catalyst accounts for a proportion within the range of from 0.05 to 20 parts by weight, based on 100 parts by weight of the total of the components (A), (B) and (C).

12. A shaped article according to claim 11, wherein the curing catalyst is ammonium perchlorate.

13. A process for producing a coated shaped article of a polycarbonate type resin combining resistance to wear and non-fogging property, which comprises:
   coating (II) a composition containing a polymer selected from the group consisting of:
   (i) a polymer possessing repeating structural units represented by the general formula (3) and
   (ii) a polymer possessing repeating structural units represented by the general formula (4) and repeating structural units represented by the general formula (5) as an undercoat layer on (I) a shaped substrate of a polycarbonate type resin, and
   coating (III) a non-fogging coating composition comprising:
   (A) 0 to 50 parts by weight of at least one compound selected from the group consisting of epoxy group-containing organic silane compounds represented by the general formula (1) and partial hydrolyzates thereof,
   (B) 20 to 80 parts by weight of a polyhidric alcohol possessing an ethylene oxide chain,
   (C) 10 to 75 parts by weight of a polymer or copolymer containing at least 20% by weight of repeating structural units represented by the general formula (2), and
   (D) a catalytic amount of a curing catalyst,
providing that the total of the amounts of the aforementioned components (A), (B) and (C) is 100 parts by weight, on said undercoat layer.

14. A process according to claim 13, wherein the repeating structural units represented by the general formula (2) are contained by at least 40% by weight in said polymer or copolymer (C).

15. A process according to claim 13, which comprises (A) 5 to 30 parts by weight of at least one compound selected from the group consisting of epoxy group-containing organic silane compounds represented by the general formula (1) and partial hydrolyzates thereof, (B) 30 to 50 parts by weight of a polyhydric alcohol having an ethylene oxide chain and (C) 30 to 50 parts by weight of a polymer or copolymer containing at least 20% by weight of repeating structural units represented by the general formula (2).

16. A process according to claim 15, which comprises (A) 5 to 15 parts by weight of at least one compound selected from the group consisting of epoxy group-containing organic silane compounds represented by the general formula (1), (B) 30 to 50 parts by weight of a polyhydric alcohol having an ethylene oxide chain and (C) 30 to 50 parts by weight of a polymer or copolymer containing at least 20% by weight of repeating structural units represented by the general formula (2).

17. A process according to claim 13, wherein the partial hydrolyzate of the epoxy group-containing organic silane compound represented by the general formula (1) or the mixture of not less than 70% by weight of said partial hydrolyzate with the balance to make up 100% by weight of said organic silane compound accounts for a proportion falling within the range of from 15 to 50 parts by weight.

18. A process according to claim 13, wherein the epoxy group-containing organic silane compound is glycidoxy alkyl trialkoxy silane.

19. A process according to claim 13, wherein the polyhydric alcohol having an ethylene oxide chain has a molecular weight within the range of from 100 to 3000.

20. A process according to claim 13, wherein the polyhydric alcohol having an ethylene oxide chain is a compound represented by the general formula:

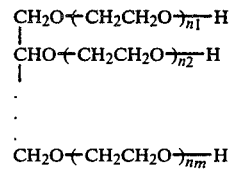

wherein, $n_1$ to $n_m$ independently stand for integers of the values of 0 to 7, at least two of which symbols represent integers of the value of at least 1, and m stands for an integer of the value of 3 to 9.

21. A process according to claim 13, wherein a composition comprising (B) 20 to 80 parts by weight of at least one compound having an ethyelne oxide chain, (C) 30 to 50 parts by weight of a polymer or copolymer containing at least 20% by weight of repeating structural units represented by the general formula (2) and (D) a catalytic amount of a curing catalyst is mixed with a cross-linking agent containing 3 to 80 parts by weight, based on 100 parts by weight of said composition, of an epoxy group.

22. A process according to claim 21, wherein the epoxy group-containing cross-linking agent accounts for a proportion within the range of from 5 to 60 parts by weight, based on 100 parts by weight of the total of the components (B) and (C).

23. A process according to claim 13, wherein the curing catalyst accounts for a proportion within the range of from 0.05 to 20 parts by weight, based on 100 parts by weight of the total of the components (A), (B) and (C).

* * * * *

UNITED STATES PATENT AND TRADEMARK OFFICE
CERTIFICATE OF CORRECTION

PATENT NO. : 4,642,266  Page 1 of 2

DATED : February 10, 1987

INVENTOR(S) : Masaaki Funaki, Noboru Ohtani, Motoaki Yoshida, Akira Fujioka and Kazuo Sakiyama It is certified that error appears in the above-identified patent and that said Letters Patent is hereby corrected as shown below:

Col. 9, line 27; "polyoxyethylenes" should read -- polyoxyethylene --
Col. 9, line 52; "polyethylene" should read -- polyoxyethylene --
Col. 12, line 25; "members," should read -- members. --
Col. 13, line 27; "(meh-" should read -- (meth- --
Col. 13, line 28; "(meh)" should read -- (meth) --
Col. 13, line 33; "esecially" should read -- especially --
Col. 13, line 40; "(meh)" should read -- (meth) --
Col. 13, line 64; "malamine." should read -- melamine. --
Col. 20, approximately line 52; after the solid line under "Control 10" insert the following as a footnote; -- The numerical values in parentheses are proportions of solids content polymerized, based on the total of (C) + (B) taken as 100. --
Col. 21, line 21; "Rogh" should read -- Rough --
Col. 21, line 24; "Rogh" should read -- Rough --
Col. 21, lines 34, 35 & 36; delete all three lines starting with "The numerical" through "as 100."
Col. 21, line 44; "cross-linkg" should read -- cross-linking --
Col. 22, line 18; "chemical" should read -- Chemical --
Col. 24, line 7; "hydroxylate" should read -- hydrolyzate --
Col. 24, line 17; "that solids" should read -- that the solids --
Col. 29, lines 50 & 51; "compolymer" should read -- copolymer --
Col. 29, line 60; "independent by" should read -- independently --

UNITED STATES PATENT AND TRADEMARK OFFICE
CERTIFICATE OF CORRECTION

PATENT NO. : 4,642,266

DATED : February 10, 1987

INVENTOR(S) : Masaaki Funaki, Noboru Ohtani, Motoaki Yoshida, Akira Fujioka and Kazuo Sakiyama It is certified that error appears in the above-identified patent and that said Letters Patent is hereby corrected as shown below:

Col. 30, line 62; "catalyst is" should read -- catalyst, providing that the total of the component (B) and (C) is 100 parts by weight, is --

Col. 32, line 39; "ethyelne" should read -- ethylene --

Col. 32, line 43; "catalyst is" should read -- catalyst, providing that the total of the component (B) and (C) is 100 parts by weight, is --

Signed and Sealed this

Seventeenth Day of May, 1988

Attest:

DONALD J. QUIGG

Attesting Officer

Commissioner of Patents and Trademarks